United States Patent [19]

Mifsud

[11] 4,295,213
[45] Oct. 13, 1981

[54] COMPOSITE SEISMIC SIGNAL

[75] Inventor: Joseph F. Mifsud, Houston, Tex.

[73] Assignee: Exxon Production Research Company, Houston, Tex.

[21] Appl. No.: 83,059

[22] Filed: Oct. 9, 1979

[51] Int. Cl.³ .............................................. G01V 1/143
[52] U.S. Cl. ...................................... 367/41; 367/23; 367/49; 367/189; 364/421
[58] Field of Search ........................ 367/23, 40, 41, 49, 367/59, 189; 364/421, 574, 725, 728; 343/100 LE

[56] References Cited

U.S. PATENT DOCUMENTS

| 3,326,320 | 6/1967 | Forester | 367/23 |
| 3,332,511 | 7/1967 | Silverman | 367/41 |
| 3,885,225 | 5/1975 | Anstey et al. | 367/41 |
| 4,014,403 | 3/1977 | Mifsud | 181/114 |
| 4,037,190 | 7/1977 | Martin | 367/40 |
| 4,156,876 | 5/1979 | Debusser | 343/50 P |
| 4,159,463 | 6/1979 | Silverman | 367/59 |

FOREIGN PATENT DOCUMENTS

| 1913875 | 10/1970 | Fed. Rep. of Germany | 367/40 |
| 2728373 | 7/1978 | Fed. Rep. of Germany | 367/40 |
| 2338499 | 1/1976 | France | 367/49 |
| 195138 | 6/1967 | U.S.S.R. | 367/41 |

OTHER PUBLICATIONS

Handly, "Vibralakator", 6/78, pp. 1-68, M.S. Thesis, Colorado School of Mines, T-2082.
Werner et al., "Cambisweep-A Contribution to Sweep Techniques," 3/79, pp. 78-105, Geophys. Prosp., vol. 27.
Bernhardt et al., "Encoding . . . Vibroseis System", 3/1978, pp. 184-193, Geophysical Prospecting, vol. 26, #1.
Cunningham, "Some Alternate Vibrator Signals", 11/1/78, pp. 1901-1914, Geophysics, vol. 44, #2, 48th SEG Meeting.

Primary Examiner—Nelson Moskowitz
Attorney, Agent, or Firm—James S. Hsue

[57] ABSTRACT

This invention provides for transmission of composite swept sine wave seismic signals wherein auto-correlation side lobes of such signals are reduced. The frequency spectrum of a desired swept sine wave seismic signal is divided into a number of consecutive segments, and the segments are arranged to form a sequence of segments by the order of frequency content. Component swept sine wave seismic signals each covering a segment in the sequence are generated simultaneously from the same location to produce the desired seismic signal. The component swept sine wave seismic signals are generated in a manner so that they alternate as upsweeps and downsweeps for consecutive segments in the sequence of segments. The seismic signal comprising the sum of the component swept sine wave seismic signals will have an auto-correlation function with reduced side lobes. Alternatively, the component swept sine wave seismic signals may be generated successively from the same location in a manner so that they alternate as upsweeps and downsweeps for consecutive segments in the sequence of segments. The reflections are successively recorded and stacked prior to correlation with the sum of the component swept sine wave seismic signals. Used in this manner, the sum of the component swept sine wave seismic signals will also have an auto-correlation function with reduced side lobes.

8 Claims, 8 Drawing Figures

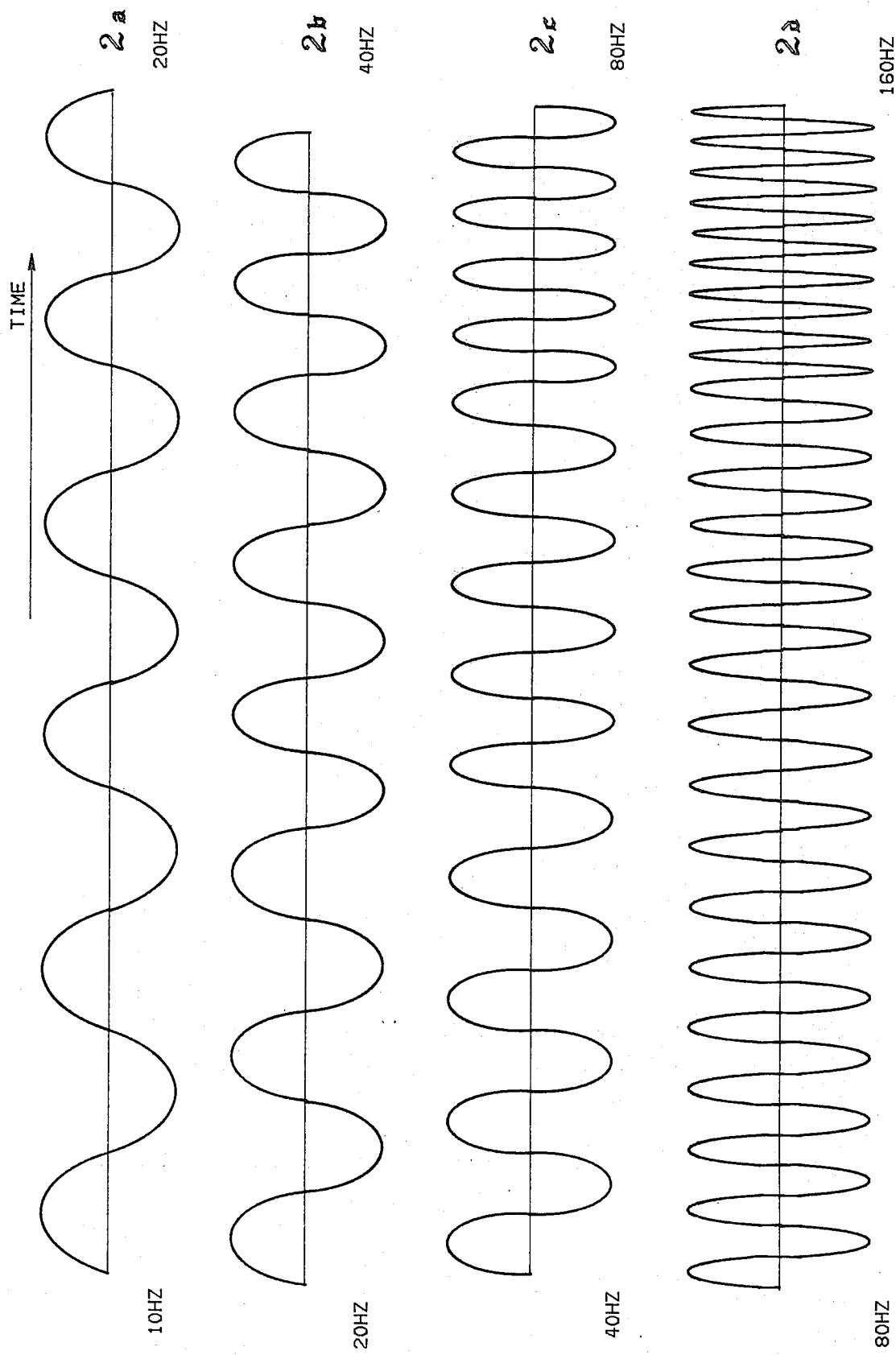

AUTO-CORRELATION OBTAINED BY PRIOR ART

AUTO-CORRELATION OBTAINED BY METHODS OF THE INVENTION

COMPOSITE SEISMIC SIGNAL

BACKGROUND OF THE INVENTION

1. Field of the Invention

This invention relates in general to seismic prospecting, and in particular, it relates to a method for generating seismic signals.

2. Description of the Prior Art

To locate reflecting interfaces in the earth, seismic signals are transmitted through the earth, reflected by subterranean interfaces and are detected and recorded. The time lapse between the transmission, reflection by an interface, and detection of a signal gives the two-way travel time of the signal through the earth, which is then used to locate the interface.

Typically many subterranean interfaces are present in the earth, and a transmitted signal is reflected by a number of such interfaces to produce a number of reflected signals, which are detected and recorded. If the reflected signals do not superimpose significantly when received, the arrival times of the reflected signals may be readily determined to locate the interfaces. Many different methods have been used to generate seismic signals. Where a seismic signal is of short duration, as is the case where dynamite detonation or weight drop is used to generate the seismic signal, the reflected signals do not superimpose significantly and the arrival times of the reflected signals can be readily identified. If a vibratory seismic source is used, the seismic signal generated is of relatively longer duration and the reflected signals from different interfaces typically superimpose one another. The similarity of the reflected signals to the transmitted signal is often masked by superimposition of the many arriving reflected signals. It is difficult to locate, by visual observation of the seismic field record alone, an arrival time at which the reflection from an interface occurs. Correlation methods have been developed to help solve such problems.

The cross-correlation function of the transmitted signal and the received signal is a graph of the similarity between the two signal waveforms as a function of the time shift between them. The waveform of the received signal is obtained from the receiver recording, which typically starts at the time when transmission of the seismic signal begins. In the correlation process, the instantaneous amplitudes of the received signal and of the transmitted signal are multiplied and the product summed over the duration of the transmitted waveform. The process is repeated with the transmitted signal progressively shifted in time relative to the received signal, and the summations are plotted against the time shifts to produce a cross-correlation curve. A typical transmitted signal consists of a sine wave sweeping over a frequency spectrum as a function of time. At the time shift where the similarity in frequency of superimposing parts of the transmitted signal and of the reflected signals is maximum, the sum of the products of the instantaneous amplitudes is higher than those at adjacent time shifts, and the cross-correlation curve has a maximum. The maxima therefore indicate on the recording the arrival times of the corresponding reflected signals. The time shifts from the initiation of transmission to points corresponding to correlation maxima are taken as the travel times through the earth of the sweep signal from the point of transmission to the reflecting interfaces and back to the receiver. For a fuller exposition of principles of correlation, see "Correlation Techniques - A Review" by N. A. Anstey in Volume 12, No. 4 (1964), of Geophysical Prospecting at pages 355-382.

While the cross-correlation method is helpful in revealing the similarity of the detected signal to the transmitted signal, the process of cross-correlation creates certain problems as well. It is well known that where a signal is cross-correlated with itself, in a process known as autocorrelation, there are always side lobes in addition to the principal lobe, or main correlation peak. The side lobes are generally of smaller amplitude than the principal lobe. If the signal used in seismic surveys is crosscorrelated with the received signal from an interface, similar side lobes will also appear in the cross-correlation function in addition to the principal lobe. The principal lobe in both auto-correlation functions and cross-correlation functions for swept frequency signals occurs where the similarity in frequency of the two waveforms correlated is maximum, and therefore occurs at the time shift of interest. In the cross-correlation method the time shift at which the principal lobe occurs indicates the time of arrival of the reflected signal.

Frequently there are more than one subterranean interface that reflect the transmitted signal, and consequently more than one correlation maximum or principal lobe will then appear in the cross-correlation function. The interfaces are usually at different depths and the reflected signals from such interfaces are usually weaker for deeper interfaces. Also, some interfaces do not reflect as much of the signal as other interfaces. The principal lobes corresponding to the interfaces therefore have different amplitudes. It is important to be able to identify in cross-correlation functions such principal lobes that correspond to subterranean interfaces. The side lobes that are inherent to the correlation process, even though of lesser amplitudes than the principal lobe, may be mistaken as the principal lobes corresponding to other interfaces. To avoid such mistakes, it is important to reduce the side lobes that accompany the principal lobe in cross-correlation functions.

It is generally acknowledged that methods of reducing autocorrelation side lobes of a seismic signal will also reduce similar side lobes in the cross-correlation function of that seismic signal.

In the past seismic signals have normally been generated by transmitting from each seismic source a swept sine wave over the entire selected frequency range of interest. It is difficult, however, to manufacture seismic sources which operate efficiently over the entire range of interest which may be from 10 to 160 Hz, or more. To improve transmission efficiency, it may be preferable to utilize a plurality of sources each adapted to operate efficiently over a portion of the desired frequency range, to generate simultaneously portions of the frequency range of the desired signal. Alternatively, it may be desirable to utilize a single vibrator, or a plurality of vibrators, to successively generate portions of the selected swept sine wave seismic signal.

Methods of transmitting seismic signals have been developed wherein different portions of the selected swept sine wave seismic signal are transmitted, successively in some methods and simultaneously in others. It has not been known, however, how to generate a selected swept sine wave seismic signal by sumultaneously generating a plurality of component signals covering different portions of a desired frequency spectrum without generating high amplitude side lobes within the correlation function. Nor has it been known how to generate a swept sine wave seismic signal by transmitting successively a plurality of component signals covering different portions of the desired frequency spectrum, and stacking the reflected signals prior to correlation without generating such high amplitude side lobes.

Margin, in U.S. Pat. No. 4,037,190 (1977), proposed using a number of sweeps having different beginning and final frequencies successively generated by the same vibrator, and stacking the correlograms corresponding to these sweeps. Martin claimed that, since the sweep signals have different frequency ranges, the side lobes from the cross-correlation function of each sweep signal will be dissimilar. By stacking a sufficient number of such cross-correlation functions or correlograms, Martin claimed that the side lobes will tend to cancel one another, while the main lobes will simply add.

Using signals covering different frequency ranges may or may not produce correlograms with side lobes that are dissimilar. Depending on the particular frequency ranges selected, the side lobes may be dissimilar, or they may actually be quite similar so that stacking the correlograms will yield strong side lobes. Martin's method also requires the repetition of the steps of transmitting a sweep signal, detecting its reflection, and cross correlating for a large number of sweeps. Such steps are repeated successively with different sweep signals. Considerable field time is therefore required.

Werner et al, in German Offenlegungschrift No. 2,728,373, laid open on July 20, 1978, disclosed a method for improving correlation where one vibrational source is used. The transmitted signal is composed of several component signals that are transmitted consecutively. One disclosed transmitted signal, which contains alternating upsweep and downsweep component signals, is stated to be suitable for reducing certain interferences due to harmonics by improving the symmetry of the auto-correlation pulse. Two signals were given by Werner et al as examples to illustrate this claim. However, if the several component signals are first stacked and then auto-correlated, the auto-correlation functions produced by using these two illustrative signals will still contain strong side lobes.

The first of the two illustrative signals described by Werner et al comprises four component signals generated consecutively: an upsweep from 12 to 80 Hz, a downsweep from 80 to 12 Hz, another upsweep from 12 to 80 Hz, and another downsweep from 80 to 12 Hz. The four component signals contain exactly the same frequency content. The four signals are stacked and then auto-correlated in order to obtain the auto-correlation function of the composite signal. Thus when a portion of one of the component signals superimposes a portion of a different component signal in the autocorrelation process wherein the two portions have similar frequencies, the auto-correlation function will have a higher value at that particular time shift, thereby producing a strong side lobe. Since the four component signals have exactly the same frequency content, the superimposition of portions of different component signals with similar frequencies will occur frequently in the auto-correlation process. The auto-correlation function of the first illustrative signal will therefore contain a number of strong side lobes.

The second illustrative signal in Werner et al comprises four component signals generated consecutively: an upsweep from 12 to 80 Hz, a downsweep from 76 to 16 Hz, another upsweep from 21 to 71 Hz, and another downsweep from 64 to 27 Hz. While the four component signals do not contain exactly the same frequency content, the four component signals contain the frequencies from 27 to 64 Hz, which comprise a major portion of the frequency content of each of the four component signals. If the four signals are stacked and then auto-correlated, the superimposition of portions of different component signals with similar frequencies will also occur frequently in the auto-correlation process. Therefore, the auto-correlation function of the second illustrative signal will also contain a number of strong side lobes.

A method of simultaneous transmission by several vibrators to survey cross-dip components of subterranean interfaces was disclosed by Anstey et al in U.S. Pat. No. 3,885,225 (1975), based on an earlier United Kingdom application filed on July 21, 1972 (34164/72). The vibrators are spaced apart transversely of the line of profile. The normal frequency bandwidth of each vibrator is divided into several parts, and these are allocated to individual vibrators. Mutually exclusive parts of the bandwidth are emitted by the several vibrators at any one time. The reflected signals originating from the several vibrators are recorded on a single recording. The recorded signals are cross-correlated with each of the signals covering different parts of the bandwidth so as to separate reflected signals from different vibrators on the basis of frequency. Three dimensional information of the interfaces is thereby provided. Therefore, instead of correlating the recorded signals with the composite signal formed by combining all the simultaneously transmitted signals, Anstey et al proposed correlating the recorded signals with each of the simultaneously transmitted signals separately to yield three dimensional subterranean information.

SUMMARY OF THE INVENTION

This invention is a method of generating a swept frequency seismic signal within a selected frequency spectrum comprising transmitting from substantially the same location a plurality of component signals within the selected frequency spectrum. In a preferred embodiment, the selected frequency spectrum is divided into a plurality of substantially non-overlapping frequency segments. A plurality of component swept sine wave seismic signals are generated simultaneously so that each of the frequency segment is substantially covered by at least one of said plurality of component swept sine wave seismic signals and so that for at least two of said frequency segments, contiguous in frequency content, a component swept sine wave seismic signal covering one of said two frequency segments sweeps in an ascending order of frequency and the component swept sine wave seismic signal covering the other of said two frequency segments sweeps in a descending order of frequency.

In an alternate preferred embodiment, the same steps as in the preferred embodiment described earlier may be used, except that the plurality of component swept sine wave seismic signals are generated successively instead of simultaneously. The reflection of each component swept sine wave seismic signal from subsurface structures is recorded in a manner so that the reflections are stacked.

BRIEF DESCRIPTION OF THE DRAWINGS

FIG. 2 graphically illustrates four component swept sine wave seismic upsweep signals 2a, 2b, 2c, 2d covering a sequence of consecutive frequency segments 10-20 Hz, 20-40 Hz, 40-80 Hz, 80-160 Hz.

DESCRIPTION OF THE PREFERRED EMBODIMENTS

This invention may be applied in both land and marine seismic surveys. A typical land seismic vibrator that may be used in this invention is the electrohydraulically operated vibrator described in U.S. Pat. No. 4,114,722 (1978) to Weber et al. A typical marine seismic vibrator that may be used in this invention is the electrohydraulically operated vibrator described in U.S. Pat. No. 3,482,646 (1969), issued to Brown et al.

Figure 1A:
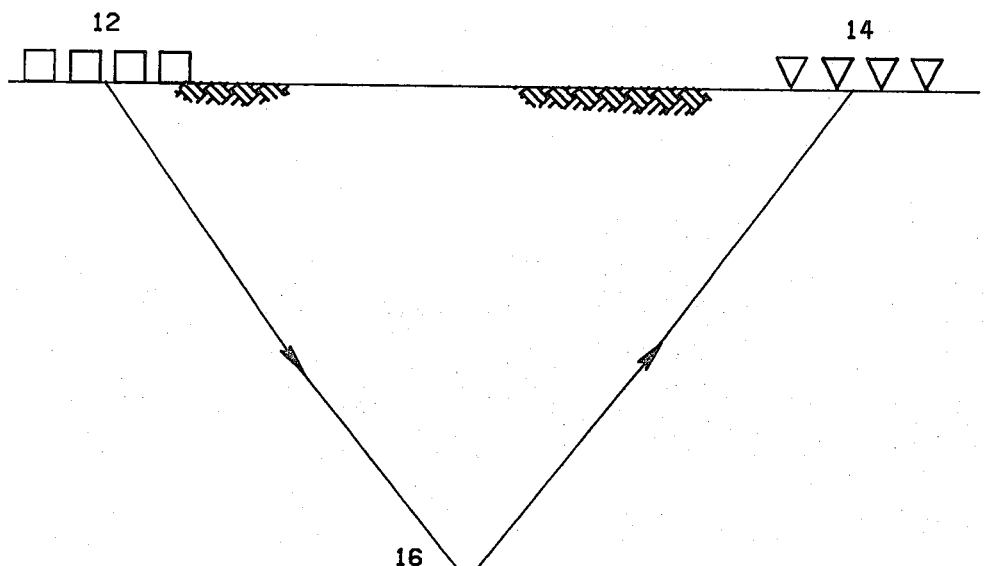
FIG. 1*a* is a schematic, simplified view of a land seismic system that may be used in this invention.
Figure 1B:
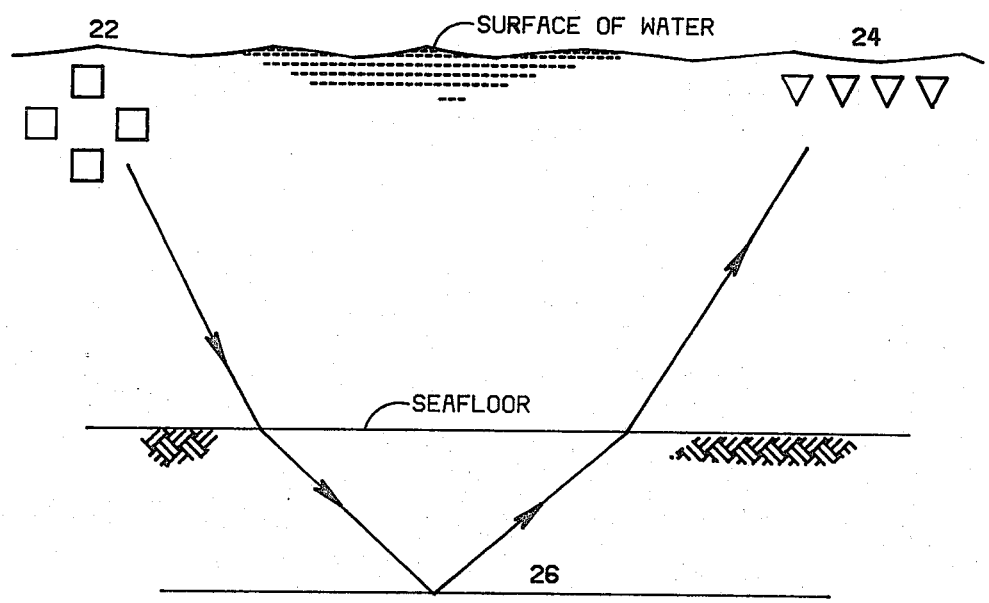
FIG. 1*b* is a schematic, simplified view of a marine seismic system that may be used in this invention.

FIG. 1a shows schematically a land seismic system that may be used in practicing this invention; FIG. 1b shows schematically a marine seismic system that may be used in this invention.

Typically, in the land system, a plurality of vibrators 12 are placed in close proximity at the desired location on the earth's surface. To the geophones 14 placed at a distance from vibrators 12, the signals from vibrators 12 may appear to come from one location. Land vibrators 12 are operated in a conventional manner, and the seismic signals generated are reflected by subterranean surfaces such as 16, and detected by detectors 14, also in a conventional manner. A plurality of marine vibrators 22 in FIG. 1b are also placed in water in close proximity to one another for the same reason as explained in the case of land vibrators 12 and operated in a conventional manner. Signals generated are reflected by subterranean surfaces such as 26 and detected in a conventional manner by hydrophones 24, also disposed in water.

This invention is applicable in like manner in both marine and land seismic systems, and the discussion below will apply to both systems. The term "vibrators" will be used to refer to both land and marine vibrators, and the term "detectors" will include both geophones and hydrophones. It may be difficult to design efficient seismic vibrators that will radiate appreciable energy over a broad frequency spectrum. For this reason, it may be preferable to use a combination of vibrators each adapted to radiate efficiently over a different part of the desired frequency spectrum. For example, vibrators generating higher frequencies may be equipped with smaller vibrator plates and larger cross-section of hydraulic pistons to drive the vibrator plates.

In a preferred embodiment of the invention, the frequency spectrum of a desired swept sine wave seismic signal is divided into a plurality of consecutive segments. These segments form a sequence running from one end of the frequency spectrum of the desired seismic signal to the other end. For example, FIG. 2 illustrates the segments that a typical desired frequency spectrum, 10 Hz to 160 Hz, may be divided into: 10-20 Hz, 20-40 Hz, 40-80 Hz and 80-160 hz. FIG. 2 shows these four component swept sine wave seismic signals 2a, 2b, 2c, 2d sweeping from low to high frequencies which may be referred to as upsweep signals. If signals 2a, 2b, 2c and 2d are generated simultaneously to produce a composite swept sine wave seismic signal and this composite signal auto-correlated, the auto-correlation function will resemble the curve 200 in FIG. 5a. The part of curve 200 to the right side of line 206 is plotted to a vertical scale one-tenth that of the scale of curve 200 to the left of line 206. For the reasons discussed below, unnecessarily high amplitude side lobes are generated.

At zero time shift, the composite signal overlaps itself entirely so that all the products of the ordinates are positive, and the sum of the products is large. This large sum is shown as peak 202 of the principal lobe at zero time shift of the auto-correlation function in FIG. 5a. The composite signal is then time shifted with respect to itself and the products of the instantaneous amplitudes summed to give the value of the auto-correlation function at a time shift larger than zero. Some of the products of the amplitudes are negative and the value of the auto-correlation function decreases. But the products of the amplitudes are never all negative, and thus the negative trough 203 has a lesser amplitude than peak 202.

At time shifts close to zero, the two composite signals correlated do not differ significantly in frequency at points along the superimposing parts. The superimposition and correlation of signal parts with slightly different frequencies produce the peaks and troughs adjacent to peak 202. At increased time shifts, the difference in frequency of superimposing parts of the two composite signals increases, and each positive product of the ordinates is largely offset by a negative product so that the sum is small. Hence the auto-correlation function decreases in amplitude as time shift increases.

Figure 5A:
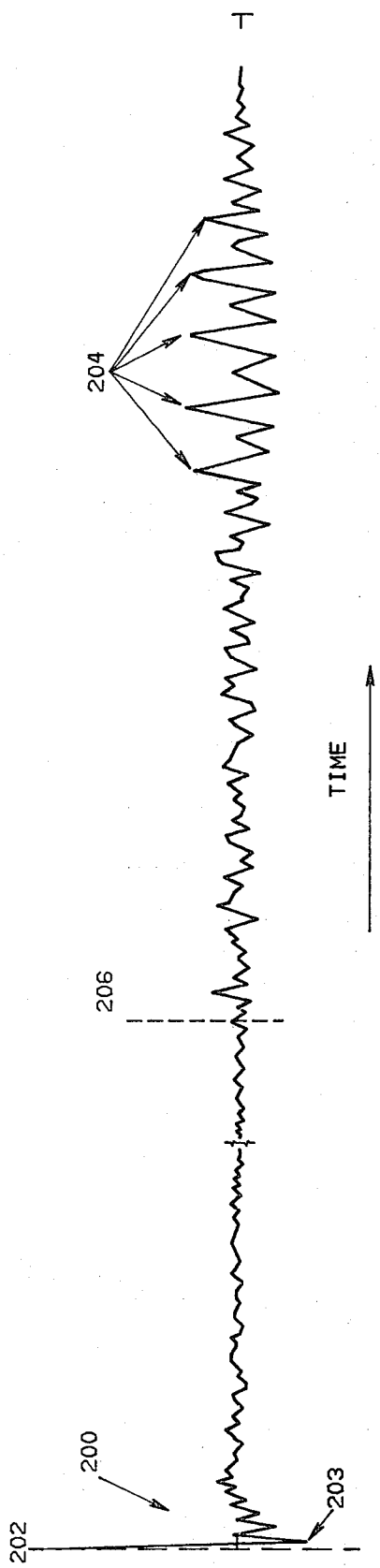
FIG. 5a graphically illustrates the auto-correlation function of the composite signal produced by generating 2a, 2b, 2c, 2d simultaneously.

When time shifts approach the duration of the composite signal, the beginning part of the composite signal superimposes the end part of a replica of the composite signal. When this occurs, the superimposing parts of the two composite signals again have the same or only slightly different frequencies. Referring to the component signals 2a, 2b, 2c, 2d, the ending part of component signal 2a ending at 20 Hz superimposes the beginning part of 2b beginning at 20 Hz. The ending part of 2b ending at 40 Hz superimposes the beginning part of 2c beginning at 40 Hz, and the ending part of 2c ending at 80 Hz superimposes the beginning part of 2d beginning at 80 Hz. This superimposition of parts of component signals having the same or only slightly different frequencies produces the large side lobes 204 in the auto-correlation function of the composite signal as shown in FIG. 5a.

It is accepted that if the composite signal shown in FIG. 2 is used in seismic surveys, the cross-correlation function will typically have a similar principal lobe and similar side lobes as those described for the auto-correlation function. The time shift at which the peak of the principal lobe occurs indicates the travel time of the composite signal between transmission and detection. Frequently there are more than one subterranean interface that reflect the transmitted signal. Thus detected signals frequently contain reflections from a number of subterranean interfaces. A side lobe of the cross-correlation function of a reflection from one interface may be mistaken for the principal lobe caused by a reflected signal from a different subterranean interface. Therefore it is desirable to reduce such side lobes. It is generally acknowledged that if a side lobe of the auto-correlation function is reduced, the corresponding side lobe of the cross-correlation function will also be reduced.

Figure 3:
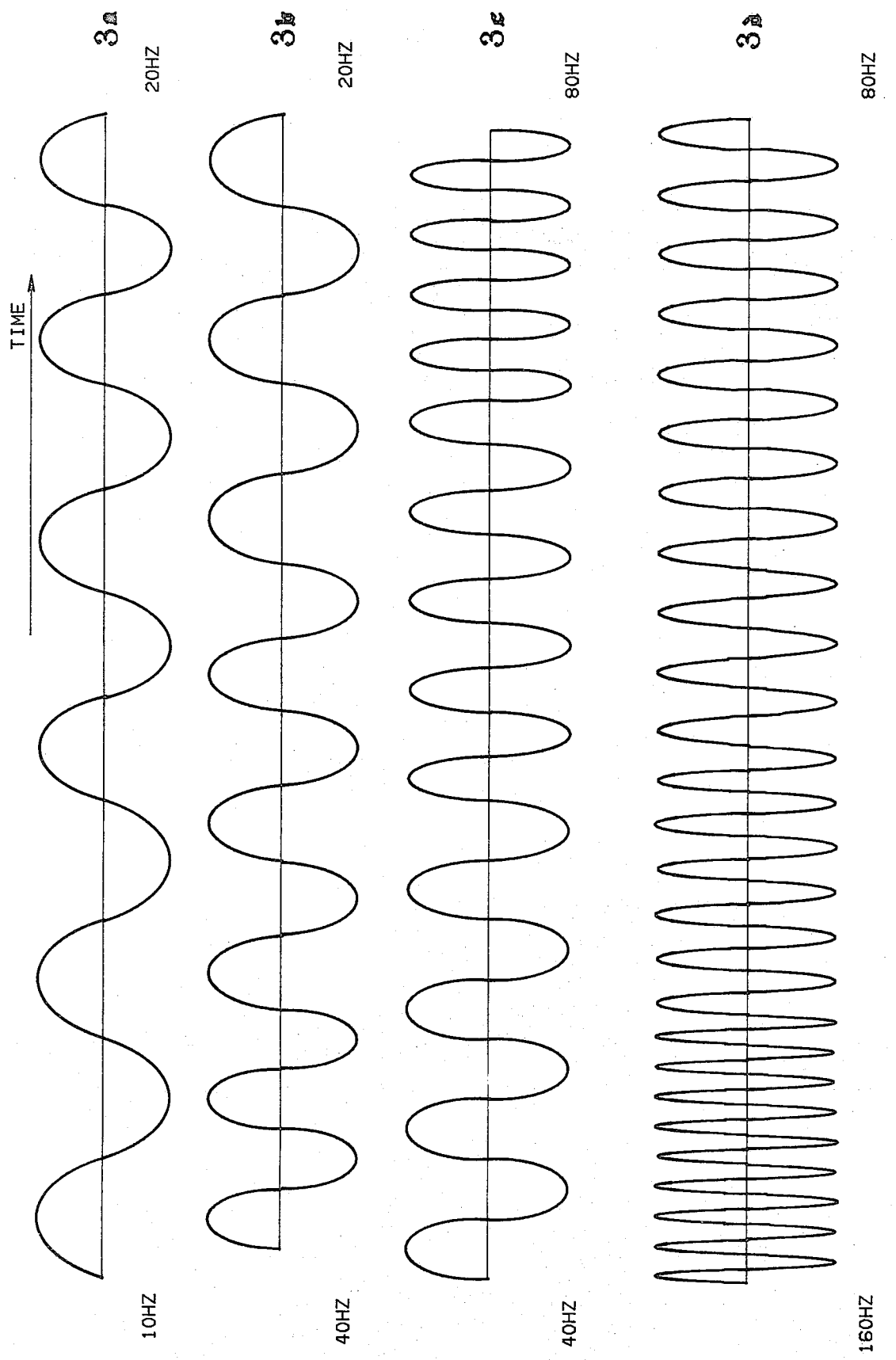
FIG. 3 graphically illustrates four component swept sine wave seismic signals 3a, 3b, 3c, 3d alternating in upsweeps and downsweeps, that are compared with signals 2a, 2b, 2c, 2d to illustrate the invention.
Figure 5B:
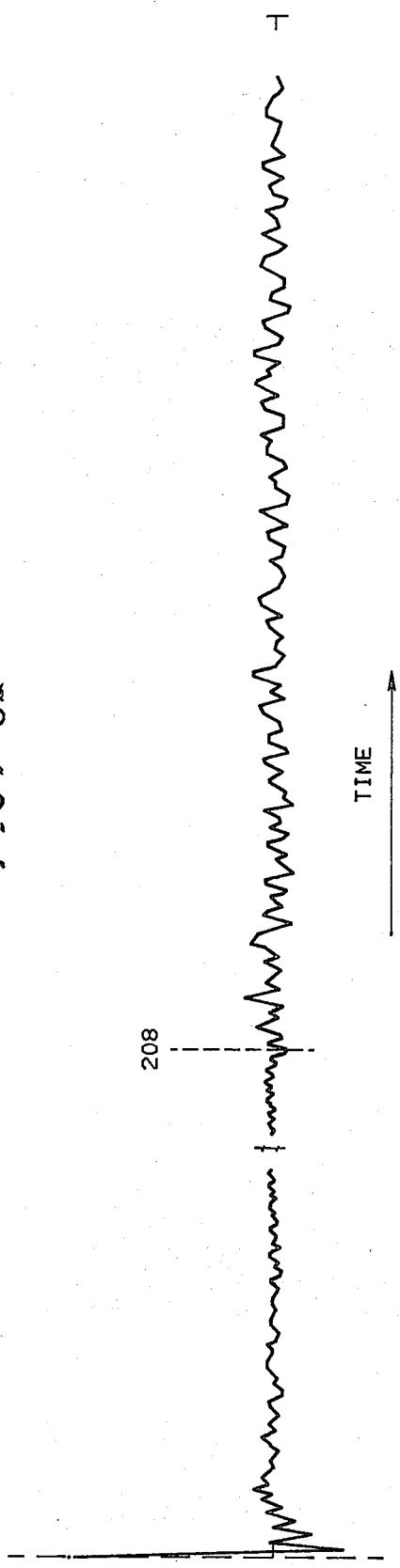
FIG. 5b graphically illustrates the auto-correlation function of the composite signal produced by generating 3a, 3b, 3c, 3d simultaneously.

According to a preferred embodiment of this invention, simultaneously generated component signals are used that alternate as upsweeps and downsweeps over the frequency spectrum of the desired seismic signal from one end to the other end. FIG. 3 graphically shows four component swept sine wave seismic signals, alternating in upsweeps and downsweeps, that illustrate this invention, over the same frequency segments as shown in FIG. 2. When the beginning part of the composite signal superimposes the ending part of itself in the auto-correlation process, the superimposing parts of the two signals will not contain frequencies that are the same or are only slightly different. Instead, the beginning parts of the two component signals 3a and 3b contain frequencies at or near 10 Hz and 40 Hz, and the ending parts of the two signals contain frequencies at or near 20 Hz. The side lobes are therefore reduced. The side lobe effects caused by superimposition of frequencies at and around 40 Hz and frequencies at and around 80 Hz are reduced for the same reason. The auto-correlation function of the composite signal formed by generating simultaneously 3a, 3b, 3c, 3d will resemble the curve in FIG. 5b. As in FIG. 5a, there is a decrease in vertical scale by a factor of one-tenth past line 208 on the time scale. The envelope of the auto-correlation function of the composite signal will decrease monotonically with time.

In the preferred embodiment discussed above, the composite signal comprises a number of simultaneously transmitted component signals covering different parts of the desired frequency spectrum. In some situations it may be desirable to generate these component signals successively instead of simultaneously, and to sum or vertically stack the recordings of the reflected signals prior to correlating with the transmitted signal.

Figure 6:
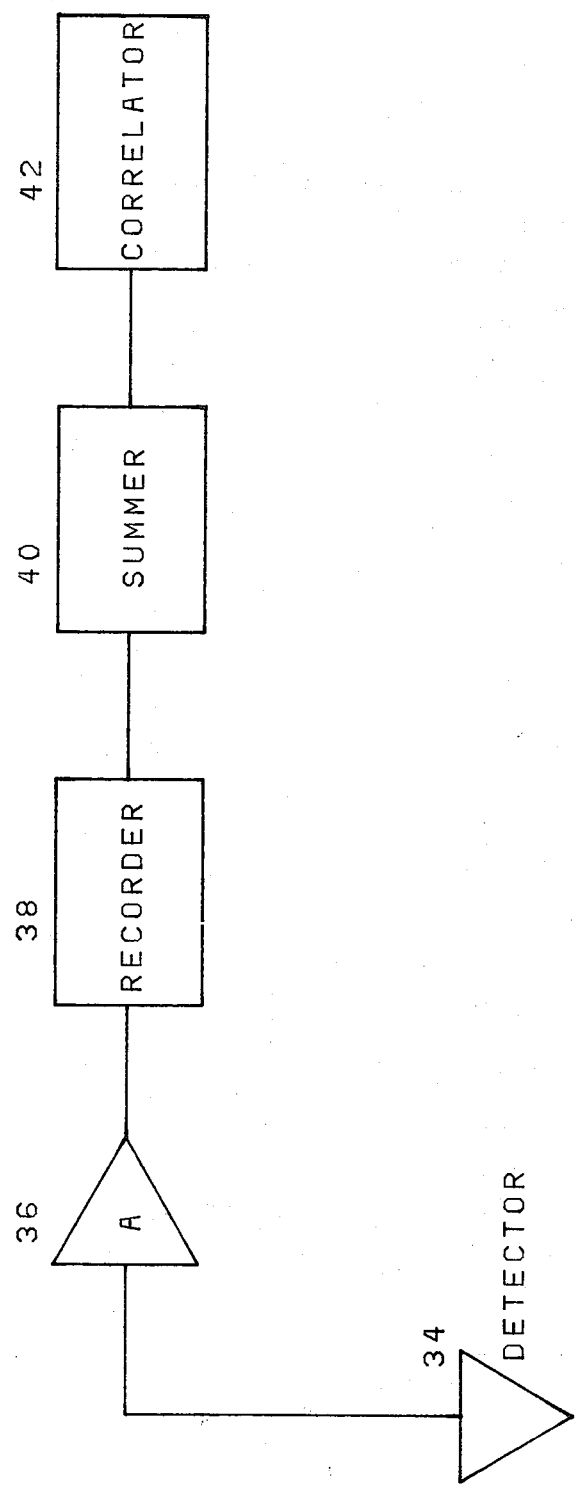
FIG. 6 is a schematic, simplified view of a seismic recording and processing system that may be used in an alternate embodiment of the invention.

According to an alternate preferred embodiment of the invention, the component signals are generated successively and alternated as upsweeps and downsweeps over consecutive segments of the frequency spectrum. For example, signals 3a, 3b, 3c, and 3d may be generated successively. FIG. 6 shows schematically a seismic recording and processing system that may be used in the alternate preferred embodiment. The reflections of signals 3a, 3b, 3c and 3d are detected by detector 34 and are transformed by detector 34 into electrical signals of waveforms similar to those of the corresponding reflections in a conventional manner. The electrical signals are amplified by amplifier 36, recorded by recorder 38, and vertically stacked by summer 40 in a conventional manner. Typically the recording of each individual electrical signal is not kept in recorder 38, but is added to the recording of the previous signal, or the sum of such signals. At the end of the stacking and recording process, only the final sum is recorded. This final sum is then cross-correlated with the sum of the transmitted component signals. The side lobes of the cross-correlation function are reduced compared to the side lobes where the component signals are generated as all upsweeps such as 2a, 2b, 2c and 2d, or as all downsweeps for the same reasons as where the component signals are transmitted simultaneously.

Where the vibrator used is tunable, the vibrator may be successively tuned to resonate at a frequency within the frequency segment of each of the component signals generated. A suitable tunable vibrator that may be used for this purpose is disclosed in Mifsud, U.S. Pat. No. 4,014,403 (1977). Before each component signal is generated, the vibrator may be tuned to resonate within the frequency segment of the component signal to be generated. That particular component signal may, therefore, be generated at improved efficiency. This tuning process may be repeated for as many of the component signals as desired to improve transmission efficiency of the composite signal.

Figure 4:
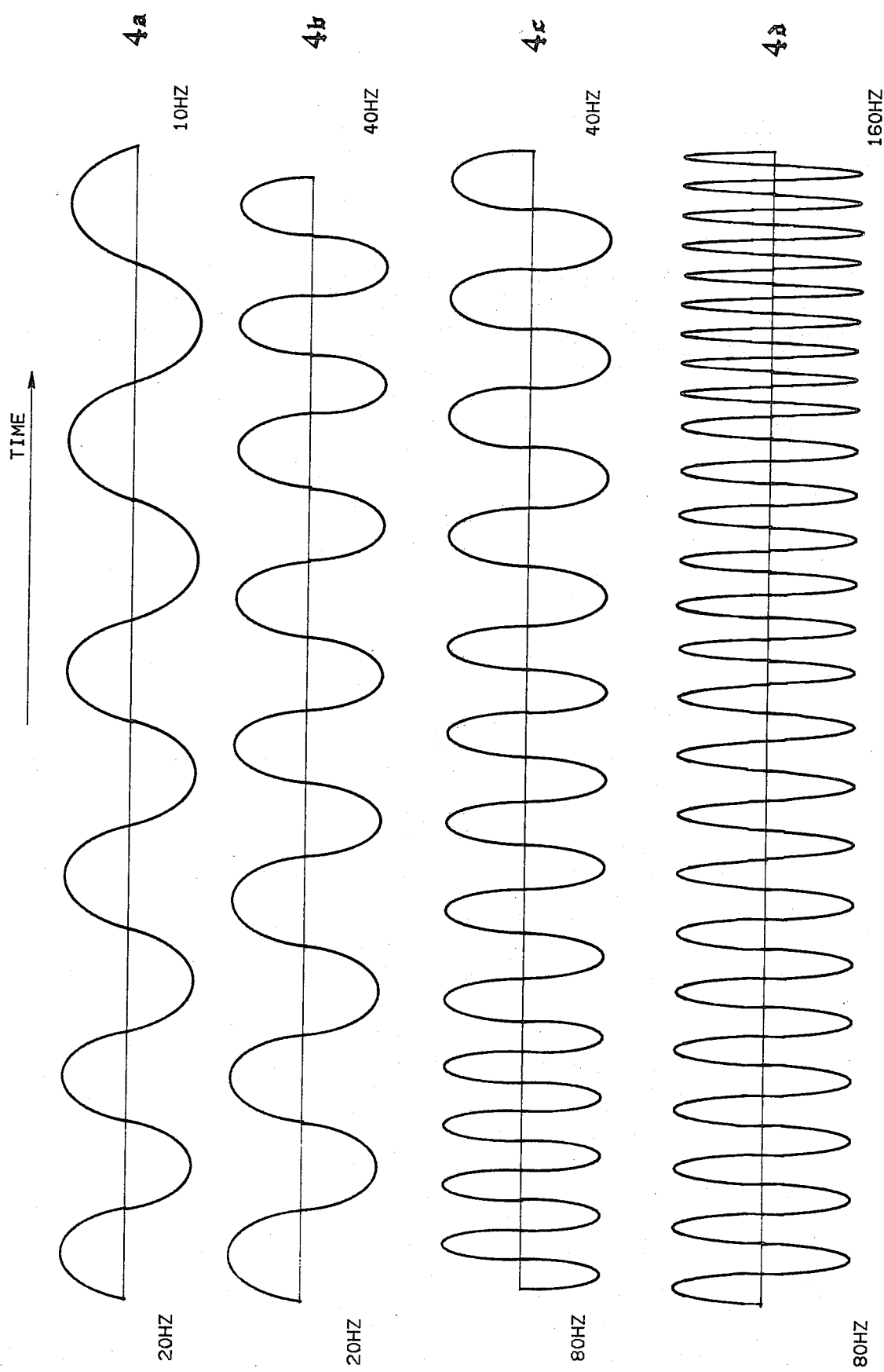
FIG. 4 graphically illustrates four component swept sine wave seismic signals 4a, 4b, 4c, 4d, alternating in upsweeps and downsweeps that are compared with signals 2a, 2b, 2c, 2d to illustrate the invention.

FIG. 4 graphically shows another four component swept sine wave seismic signals, whether successively or simultaneously transmitted, which may be combined into a composite signal with reduced auto-correlation side lobes. Signals 4a, 4b, 4c, 4d also alternate as upsweeps and downsweeps over the four consecutive frequency segments as shown in FIG. 2, and may be obtained from signals 2a, 2b, 2c, 2d by changing 2a and 2c from upsweeps to downsweeps.

From the discussion above, it will be appreciated that, for both embodiments, the side lobes are reduced even if only two of the four component signals covering two consecutive frequency segments in the sequence alternate as upsweep and downsweep.

It will be understood that the actual frequency spectrum and segments discussed above are for illustrative purposes only, and that the frequency spectrum need not be divided into octaves or necessarily into four segments, and that other manners of division may be used and will come within the scope of this invention. Component signals having different durations may also be used in applying the methods of this invention.

It will also be appreciated that the methods of this invention may be used even where there is one or more gaps in the frequency spectrum of the composite signal not covered by any of the component sweep signals. The side lobes of auto-correlation functions of such composite signals are reduced for the same reasons as explained above.

I claim:

1. A method of generating a seismic signal of selected frequency content comprising:

generating simultaneously from substantially the same location a plurality of component swept sine wave seismic signals covering selected frequency segments within the frequency spectrum of said seismic signal of selected frequency content wherein said selected frequency segments do not substantially overlap in frequency content, said plurality of component swept since wave seismic signals including at least two signals substantially covering two of said frequency segments which are substantially contiguous in frequency content, the swept sine wave seismic signal substantially covering one of said two frequency segments sweeping in an ascending order of frequency and the swept sine wave seismic signal substantially covering the other of said two frequency segments sweeping in a descending order of frequency; and correlating the sum of said plurality of component swept sine wave seismic signals with the sum of the reflections of said plurality of component swept sine wave seismic signals.

2. A method of generating seismic signals, comprising:
- selecting a plurality of substantially nonoverlapping frequency segments;
- generating simultaneously from substantially the same location a plurality of swept sine wave seismic signals so that each of said plurality of frequency segments is substantially covered by at least one of said plurality of swept sine wave seismic signals, and so that for two frequency segments contiguous in frequency content among said plurality of frequency segments, the swept sine wave seismic signal substantially covering one of said two frequency segments sweeps in an ascending order of frequency, and the swept sine wave seismic signal substantially covering the other of said two frequency segments sweeps in a descending order of frequency; and
- correlating the sum of said plurality of component swept sine wave seismic signals with the sum of the reflections of said plurality of component swept sine wave seismic signals.

3. A method of generating seismic signals to investigate subsurface structures, comprising:
- selecting a plurality of substantially nonoverlapping frequency segments;
- generating successively from substantially the same location a plurality of swept sine wave seismic signals so that each of said plurality of frequency segments is substantially covered by at least one of said plurality of swept sine wave seismic signals, and so that for two frequency segments contiguous in frequency content among said plurality of frequency segments, the swept sine wave seismic signal substantially covering one of said two frequency segments sweeps in an ascending order of frequency, and the swept sine wave seismic signal substantially covering the other of said two frequency segments sweeps in a descending order of frequency; and
- correlating the sum of said plurality of component swept sine wave seismic signals with the sum of the reflections of said plurality of component swept sine wave seismic signals.

4. A method of generating a seismic signal of selected frequency content to investigate subsurface structures comprising:
- generating successively from substantially the same location a plurality of component swept sine wave seismic signals covering selected frequency segments within the frequency spectrum of said seismic signal of selected frequency content wherein said selected frequency segments do not substantially overlap in frequency content, said plurality of component swept sine wave seismic signals including at least two signals substantially covering two frequency segments which are substantially contiguous in frequency content, the swept sine wave seismic signal substantially covering one of said two frequency segments sweeping in an ascending order of frequency and the swept sine wave seismic signal substantially covering the other of said two frequency segments sweeping in a descending order of frequency; and
- correlating the sum of said plurality of component swept sine wave seismic signals with the sum of the reflections of said plurality of component swept sine wave seismic signals.

5. A method of generating seismic signals having frequencies over a selected frequency spectrum, comprising:
- dividing said selected frequency spectrum into a plurality of consecutive segments;
- generating simultaneously from each of a plurality of vibratory sources placed in close proximity, a component swept sine wave seismic signal substantially covering a different one of said plurality of consecutive frequency segments, so that said component swept sine wave seismic signals alternate as upsweeps and downsweeps for consecutive segments over said frequency spectrum; and
- correlating the sum of said plurality of component swept sine wave seismic signals with the sum of the reflections of said plurality of component swept sine wave seismic signals.

6. A method of generating seismic signals having frequencies over a selected frequency spectrum to investigate subsurface structures, comprising:
- dividing said selected frequency spectrum into a plurality of consecutive segments;
- generating successively from at least one vibratory source placed at substantially the same location, a component swept sine wave seismic signal substantially covering a different one of said plurality of consecutive frequency segments, so that said component swept sine wave seismic signals alternate as upsweeps and downsweeps for consecutive segments over said frequency spectrum;
- recording the reflection of each of said plurality of component swept sine wave seismic signals from the subsurface structures so that said reflections are stacked; and
- correlating the stacked reflections with the sum of said plurality of component swept sine wave seismic signals.

7. A method of generating seismic signals as in claims 5 or 6, wherein said selected frequency spectrum has two ends and extends continuously from one end to the other end.

8. A method of generating seismic signals as in claims 5 or 6, wherein said selected frequency spectrum has at least one gap therein.

* * * * *